(12) United States Patent
Lu et al.

(10) Patent No.: US 10,171,868 B2
(45) Date of Patent: Jan. 1, 2019

(54) METHOD FOR PROCESSING AUDIO DATA, TERMINAL AND TELEVISION

(71) Applicants: QINGDAO HISENSE ELECTRONICS CO.,LTD., Qingdao, Shan Dong Province (CN); HISENSE INTERNATIONAL CO., LTD., Qingdao (CN); HISENSE USA CORP., Suwanee, GA (US)

(72) Inventors: Zhonghui Lu, Qingdao (CN); Shurong Li, Qingdao (CN); Qiang Wang, Qingdao (CN)

(73) Assignees: Qingdao Hisense Electronics Co., Ltd., Qingdao (CN); HISENSE INTERNATIONAL CO., LTD., Qingdao (CN); HISENSE USA CORP., Suwanee, GA (US)

( * ) Notice: Subject to any disclaimer, the term of this patent is extended or adjusted under 35 U.S.C. 154(b) by 0 days.

(21) Appl. No.: 15/869,433

(22) Filed: Jan. 12, 2018

(65) Prior Publication Data

US 2018/0139497 A1  May 17, 2018

Related U.S. Application Data

(63) Continuation of application No. PCT/CN2016/072033, filed on Jan. 25, 2016.

(30) Foreign Application Priority Data

Sep. 28, 2015 (CN) .......................... 2015 1 0629593

(51) Int. Cl.
*H04N 21/44* (2011.01)
*H04N 21/439* (2011.01)
(Continued)

(52) U.S. Cl.
CPC ... *H04N 21/4392* (2013.01); *G11B 20/10527* (2013.01); *H04N 21/42607* (2013.01);
(Continued)

(58) Field of Classification Search
CPC .... H04N 21/439; H04N 21/44; H04N 21/438; H04N 21/426; G11B 20/11
(Continued)

(56) References Cited

U.S. PATENT DOCUMENTS 6,804,178 B2  10/2004  Tada et al.
8,515,566 B2 *  8/2013  Ford ................ G11B 20/00007
                                                       381/80
(Continued)

FOREIGN PATENT DOCUMENTS

CN  101800867 A  8/2010
CN  101834978 A  9/2010
(Continued)

OTHER PUBLICATIONS

International Search Report and Written Opinion issued in International Application No. PCT/CN2016/072033, dated Jul. 4, 2016; with partial English translation.

*Primary Examiner* — Melur Ramakrishnaiah
(74) *Attorney, Agent, or Firm* — McDermott Will & Emery LLP

(57) ABSTRACT

A method for processing audio data includes: setting a first queue for managing at least one configured information control node of audio data to be played and a second queue for managing at least one configured information control node of played audio data, wherein each of the at least one configured information control node contains attribute information for the audio data to be played; unchaining a unit of the at least one configured information control node from the first queue; reading audio data to be played corresponding to
(Continued)

the unit of the at least one configured information control node according to the attribute information for the audio data to be played in the unit of the at least one configured information control node; and chaining the unit of the at least one configured information control node to the second queue.

19 Claims, 6 Drawing Sheets

(51) Int. Cl.
    *G11B 20/10*     (2006.01)
    *H04N 21/426*     (2011.01)
    *H04N 21/438*     (2011.01)
    *H04N 21/845*     (2011.01)

(52) U.S. Cl.
    CPC ... *H04N 21/4383* (2013.01); *H04N 21/44004* (2013.01); *H04N 21/8455* (2013.01); *G11B 2020/1074* (2013.01); *G11B 2020/10666* (2013.01); *G11B 2020/10675* (2013.01); *G11B 2020/10685* (2013.01); *G11B 2020/10777* (2013.01); *G11B 2020/10796* (2013.01)

(58) Field of Classification Search
    USPC ......... 700/94; 381/80; 725/145, 94; 711/110
    See application file for complete search history.

(56) References Cited

U.S. PATENT DOCUMENTS

2002/0122358 A1    9/2002    Tada et al.
2007/0008830 A1*  1/2007    Tsukazaki ........ G11B 20/00007
                                        369/1

FOREIGN PATENT DOCUMENTS

CN        103905897 A    7/2014
JP        2002-260336 A  9/2002

* cited by examiner

METHOD FOR PROCESSING AUDIO DATA, TERMINAL AND TELEVISION

CROSS-REFERENCE TO RELATED APPLICATION

This application is a Bypass Continuation Application of PCT/CN2016/072033 filed on Jan. 25, 2016, which claims priority to Chinese Patent Application No. 201510629593.2, filed on Sep. 28, 2015, entitled "METHOD FOR PROCESSING AUDIO DATA, APPARATUS AND SYSTEM", which is incorporated herein by reference in its entirety.

TECHNICAL FIELD

The disclosure relates to the technical field of audio processing, and more particularly to a method for processing audio data, a terminal and a television.

BACKGROUND

A digital television system is an end-to-end system that signals are processed in a digital way during program collection, program designing and program transmission and in client terminal. In the digital television system, in order to realize a normal play of audio data, captured audio data is stored in a ring buffer, and then is played.

SUMMARY

In a first aspect, an embodiment of the disclosure provides a method for processing audio data comprising:
setting a first queue for managing at least one configured information control node of audio data to be played, wherein each of the at least one configured information control node contains attribute information for the audio data to be played;
unchaining a unit of the at least one configured information control node from the first queue;
reading audio data to be played corresponding to the unit of the at least one configured information control node according to the attribute information for the audio data to be played in the unit of the at least one configured information control node; and
chaining the unit of the at least one configured information control node to a second queue which is used for managing at least one configured information control node of played audio data.

In a second aspect, an embodiment of the disclosure provides a terminal comprising:
a memory configured to store instructions; and
a processor coupled to the memory, wherein,
the instructions, when executed by the processor, cause the terminal to:
setting a first queue for managing at least one configured information control node of audio data to be played, wherein each of the at least one configured information control node contains attribute information for the audio data to be played;
unchaining a unit of the at least one configured information control node from the first queue;
reading audio data to be played corresponding to the unit of the at least one configured information control node according to the attribute information for the audio data to be played in the unit of the at least one configured information control node; and
chaining the unit of the at least one configured information control node to a second queue which is used for managing at least one configured information control node of played audio data.

In a third aspect, an embodiment of the disclosure provides a television, comprising:
an input interface configured to receiving audio data from a plurality of television channels;
a channel switcher configured to switching the plurality of television channels;
an audio capturer configured to capture audio data of the plurality of television channels;
a buffer configured to buffer the audio data captured by the audio capturer; and
a control reader configured to control and read the audio data in the buffer,
an audio post-processor configured to perform a preset sound processing to the audio data read by the control reader; and
an audio player configured to play the audio data processed by the audio post-processor,
wherein, the control reader is configured to:
set a first queue for managing at least one configured information control node of audio data to be played, wherein each of the at least one configured information control node contains attribute information for the audio data to be played;
unchain a unit of the at least one configured information control node from the first queue;
read audio data to be played corresponding to the unit of the at least one configured information control node according to the attribute information for the audio data to be played in the unit of the at least one configured information control node; and
chain the unit of the at least one configured information control node to a second queue which is used for managing at least one configured information control node of played audio data.

BRIEF DESCRIPTION OF DRAWINGS

In order to illustrate the technical solution in embodiments of the present disclosure more clearly, accompanying drawings to be used in the description of the embodiments or the prior art will be briefly described. Obviously, the accompanying drawings to be described below are merely some embodiments of the present disclosure, and a person of ordinary skill in the art can obtain other drawings according to those drawings without paying any creative effort.

DETAILED DESCRIPTION

The technical solutions in embodiments of the present disclosure will be clearly and fully described in conjunction with the accompanying drawings in the embodiments of the present disclosure. Obviously, the described embodiments are merely some but not all of embodiments of the disclosure. All other embodiments made on the basis of the embodiments in the present disclosure by those skilled in the art without paying any creative effort shall be included in the protection scope of the present disclosure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise.

Generally, in a situation that audio data to be played is stored in a ring buffer, when a write pointer reaches an end address of the ring buffer, the write pointer will immediately return to a start address of the ring buffer and will continue to capture new audio data. Meanwhile, because of a parallel execution of capturing and reading, if preceding audio data at the start address of the ring buffer is not read and played in time, the unread audio data will be overwritten by newly captured audio data, which in turn causes a problem of sound skipping.

In order to avoid the problem of sound skipping caused by overwriting the unread audio data, the newly captured audio data is usually copied into another piece of memory space (or memory pool), and then the copied audio data in the memory space is read and played. Although the above solution solves the problem of sounding skipping, it also introduces a series of other problems. For example, another memory space needs to be developed for separate data storing or data backup, and each data in the newly developed memory space needs to be maintained, which may increase a complexity of a system design and is not good for later maintenance. Meanwhile, frequent memory copy actions may reduce a system performance on some level, which may make operating procedures complex.

Figure 1:
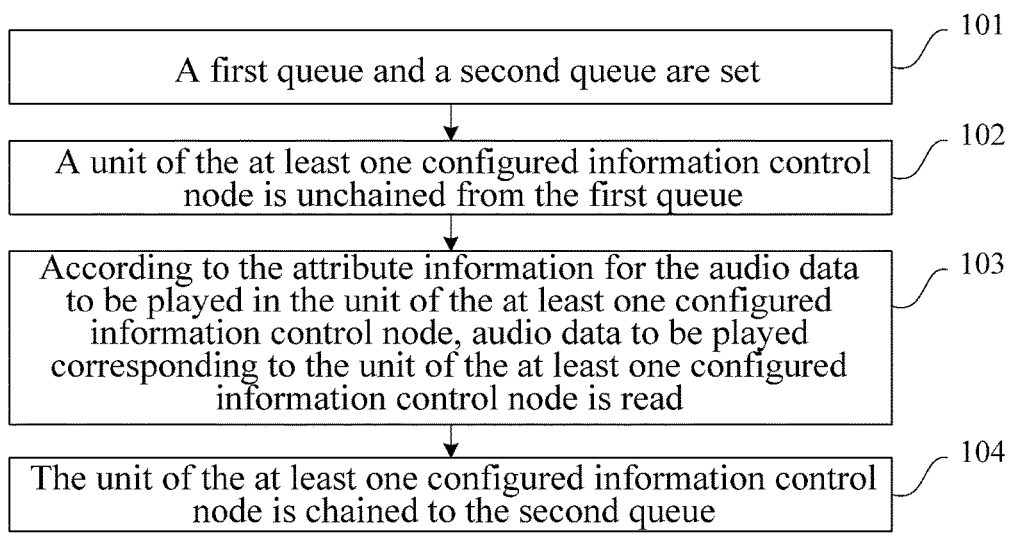
FIG. 1 is a flow chart of a method for processing audio data provided by an embodiment of the present disclosure.

In order to simplify the operating procedures and be convenient for later maintenance, an embodiment of the present disclosure provides a method for processing audio data. As shown in FIG. 1, the method comprises steps 101-104.

In step 101, a first queue and a second queue are set.

Wherein, the first queue is used for managing at least one configured information control node of audio data to be played, and each of the at least one configured information control node contains attribute information for the audio data to be played. The second queue is used for managing at least one configured information control node of played audio data.

In step 102, a unit of the at least one configured information control node is unchained from the first queue.

In step 103, according to the attribute information for the audio data to be played in the unit of the at least one configured information control node, audio data to be played corresponding to the unit of the at least one configured information control node is read.

In step 104, the unit of the at least one configured information control node is chained to the second queue.

In a method for processing audio data provided by some embodiments of the present disclosure, the first queue and the second queue are set, and the unit of the at least one configured information control node is unchained from the first queue. In addition, according to the attribute information for the audio data to be played in the unit of the at least one configured information control node, audio data to be played corresponding to the unit of the at least one configured information control node is read, and the unit of the at least one configured information control node is chained to the second queue. The audio data to be played and the played audio data may be separately managed by setting the first queue for managing the at least one configured information control node of the audio data to be played and the second queue for managing the at least one configured information control node of the played audio data, i.e. by a way of queues, in order to be effectively distinguished. Meanwhile, according to the unit of the at least one configured information control node, audio data to be played corresponding to unit of the at least one configured information control node may be read and played, and thus a problem, which is resulted by reading copied audio data to be played in the another memory space by an audio reader when the audio data to be played is copied to the memory space, may not arise. In the technical solution provided by the embodiment of the present disclosure, the audio data to be played may not be overwritten, and meanwhile the memory space developed for backup may be omitted, which may avoid costs of complex realization, management and later maintenance of the memory space and may simplify design ideas. In addition, an influence to the system performance due to the frequent memory copies is eliminated, and a memory aligning action is saved so that the operation procedure is simplified. That is, some embodiments of the present disclosure realize that the audio data to be played is not overwritten while avoiding the problem of setting the memory space, and ensure that the audio data is played in real time, orderly, smoothly and stably.

Figure 2:
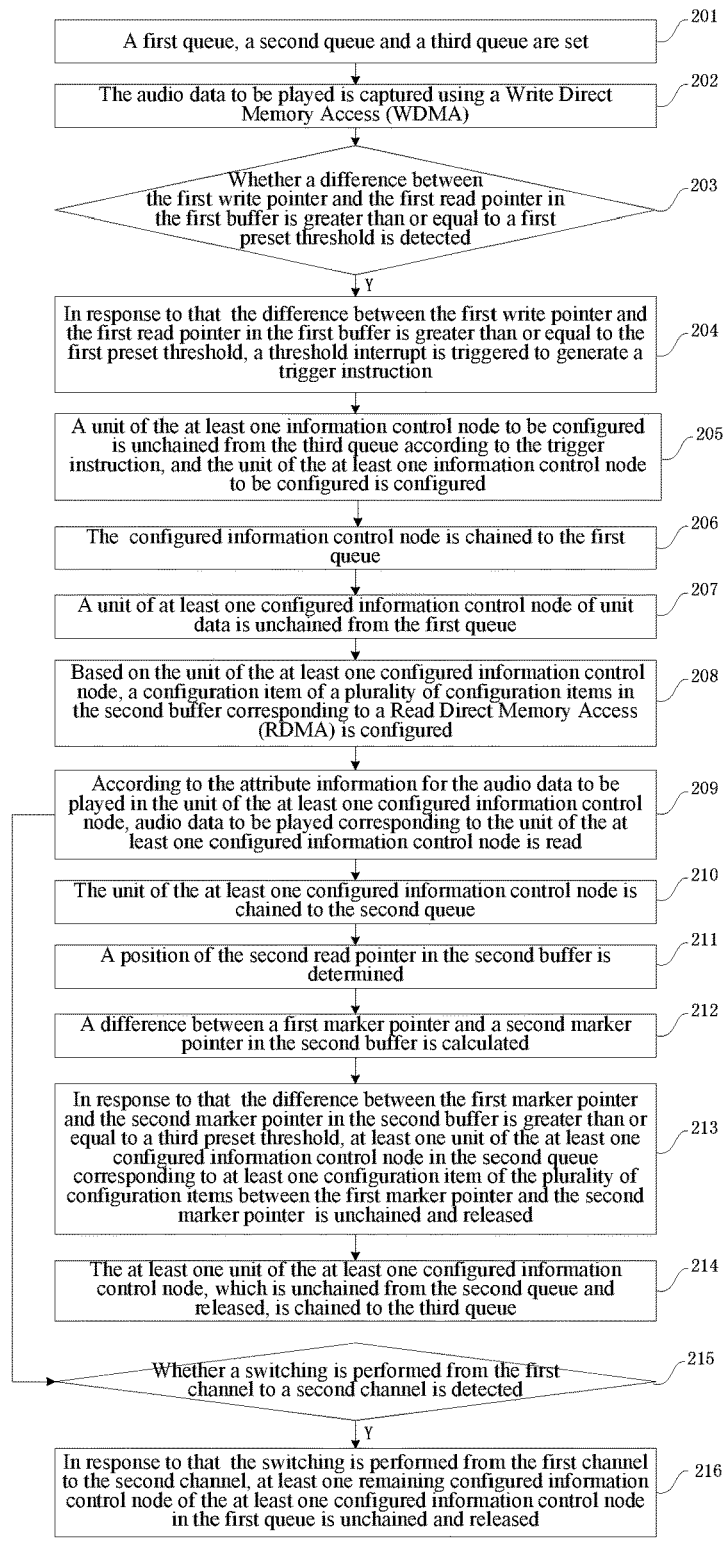
FIG. 2 is a flow chart of a method for processing audio data provided by another embodiment of the present disclosure.

An embodiment of the present disclosure provides a method for processing audio data, which will be exemplarily illustrated by presetting a first queue, a second queue and a third queue. As shown in FIG. 2, the method comprises steps 201-210.

In step 201, a first queue, a second queue and a third queue are set.

Wherein, each queue of the first queue, the second queue and the third queue may be a special linear table, and the special linear table only allows a deleting operation at the front end of the table and an inserting operation at the back end of the table. The end at which the inserting operation is performed is called a queue tail, and the end at which the deleting operation is performed is called a queue head. When there is no element in the queue, the queue is called an empty queue. In such a data structure of the queue, a first inserted element will be an element to be deleted first, whereas a last inserted element will be an element to be deleted last. Therefore, the queue is also called a "first in first out" linear table. The queue may use a linear table for storage. Alternatively, the queue may also use a chain table for storage. The embodiment of the present disclosure will be exemplarily illustrated by adopting a chain table for storage. The chain table is a discontinuous, non-sequential storage structure on a physical storage unit, and a logical order of data elements is achieved by the order of a link ordering of pointers in the chain table. The chain table consists of a series of crunodes (each of the elements in the chain table is called a crunode (the crunode is also called a node)), and the crunode is dynamically generated at run time. Generally, the crunode includes two parts: one is a data domain (a domain name of the data domain is set as "data") for storing the data elements, and the other is a pointer field (a domain name of the pointer domain is set as "next") for storing a next crunode's address. Information stored in the pointer domain is also called a pointer or a chain. The use of the chain table makes full use of memory spaces of a computer and achieves a flexible memory dynamic management.

In some embodiments of the present disclosure, the first queue is used for managing at least one configured information control node of the audio data to be played. The second queue is used for managing at least one configured information control node of the played audio data. The third queue is used for managing at least one information control node to be configured. One information control node of the configured information control node and the information control node to be configured is a node of the chain table, and is a node customized according to practical needs. Besides the pointer used for chaining, a data structure of the information control node includes storage and management information and required information for playback of the audio data. A data structure of information control node to be configured will be described below. For convenience of subsequent description, the first queue is called a tobe_played queue, the second queue is called a played queue, and the third queue is called a tobe_pushed queue.

In step 202, the audio data to be played is captured using a Write Direct Memory Access (WDMA).

Wherein, the WDMA is corresponding to a first buffer which is used for storing the audio data to be played captured in real time by the WDMA. The first buffer has a first read pointer and a first write pointer therein.

In an embodiment of the present disclosure, the first buffer is a ring buffer (hereafter called first ring buffer). The first ring buffer is a data structure which represents a fixed size of end-to-end buffer, and is suited to cache data stream. A useful property of the first ring buffer is that a storage space of the first ring buffer is recycled. The first ring buffer has a first write pointer and a first read pointer therein. The first write pointer points to a storage position of the captured audio data in the first ring buffer, and the first read pointer points to a storage position of audio data being read in the first ring buffer. Audio capturing and processing process operations of the WDMA may be performed depending on the first write pointer and the first read pointer of the first ring buffer. Wherein, the first write pointer is maintained by the WDMA itself, and the first read pointer is controlled by a CPU.

Figure 3:
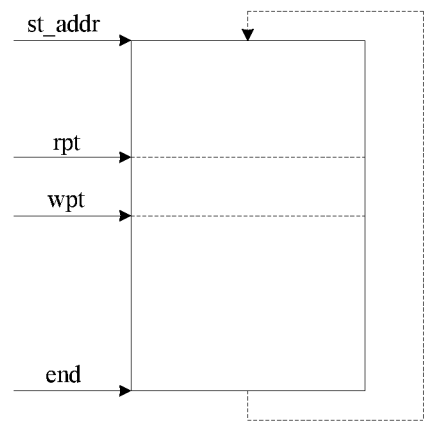
FIG. 3 is a schematic diagram of a first buffer corresponding to WDMA provided by an embodiment of the present disclosure.

FIG. 3 shows a schematic diagram of a logical relationship among the first write pointer and the first read pointer of the WDMA and the first ring buffer maintained by the WDMA. In FIG. 3, "st_addr" (start address) indicates a start address (or initial address) of the first ring buffer and "end" indicates a tail address of the first ring buffer. When the first ring buffer is initialized, both the first write pointer (wpt) and the first read pointer (rpt) are 0, i.e., both the first write pointer and the first read pointer point to the start address of the first ring buffer. When the WDMA begins to capture audio data in a channel where it is, the captured audio data will be stored starting at the start address pointed by the first write pointer. In addition, since the first buffer is a first ring buffer, when the first write pointer reaches the tail address of the first ring buffer, it automatically jumps to the start address of the first ring buffer and continues to store audio data from the start address of the first ring buffer. In this way, the storage space for storing the captured audio data is managed in a way of the ring buffer. Therefore, a problem of wasting memory space for storing captured audio data is effectively solved, and a time limit for audio capture is eliminated so that audio capture for an infinite length of time is supported.

In step 203, whether a difference between the first write pointer and the first read pointer in the first buffer is greater than or equal to a first preset threshold is detected.

In an embodiment of the present disclosure, the first preset threshold is set according to a length of the first ring buffer. As an example, the first preset threshold is less than the length of the first ring buffer. For example, if the length of the first ring buffer is N*M, i.e., the first ring buffer is equally divided into N sub-buffers, the first preset threshold may be set as M, where N is greater than or equal to 1. In this way, the first ring buffer, which is corresponding to the WDMA, is divided into N sub-buffers and each has a length of the first preset threshold. Accordingly, the same number (i.e., N) of information control nodes to be configured is allocated to the tobe_pushed queue when initializing, and these information control nodes to be configured are chained to the tobe_pushed queue by a tail insertion method. In addition, both the tobe_played queue and the played queue are an empty queue when initializing.

In step 204, in response to that the difference between the first write pointer and the first read pointer in the first buffer is greater than or equal to the first preset threshold, a threshold interrupt is triggered to generate a trigger instruction.

In step 205, a unit of the at least one information control node to be configured is unchained from the third queue according to the trigger instruction, and the unit of the at least one information control node to be configured is configured.

In an embodiment of the present disclosure, step 205 comprises sub-steps 205a and 205b.

In sub-step 205a, a unit of the at least one information control node to be configured is unchained from the third queue according to the trigger instruction.

Wherein, the unit of the at least one information control node to be configured includes at least one of channels, such as ATV Demod, AV, Component, VGA or HDMI, number of channels, such as 8-channel, 6-channel, 2-channel, etc., a sampling rate, such as 32 KHz, 35.15625 KHz, 48 KHz, etc., a start address of the audio data to be played and a data length of the audio data to be played.

In an example, the data structure of the unit of the at least one information control node to be configured is defined as follows:

```
struct ListNode
{
    int st_addr;// the start address of the audio data to be played
    corresponding to the unit of the at least one information control
    node
    int length;// the length of the audio data to be played
    corresponding to the unit of the at least one information control
    node
```

```
    int sample_rate;// the sampling rate of the channel where the
        WDMA is at
    int channel;// the channel where the WDMA is at, such as ATV
        Demod, AV, Component, VGA or HDMI
    int channel_num;// the number of channels, such as 8-channel,
6-channel or 2-channel
    ...
    ListNode *next;// items used for generating the queue, that is,
        pointing to a next information control node corresponding to the
        unit of the at least one information control node
};
```

Certainly, the data structure of the unit of the at least one information control node to be configured may be deleted in part or increased according to actually needed information to meet actual needs of users.

In step 205b, the start address and the length of the audio data to be played are configured into the unit of the at least one information control node to be configured according to audio data to be played between the first read pointer and the first write pointer in the first buffer.

Figure 4:
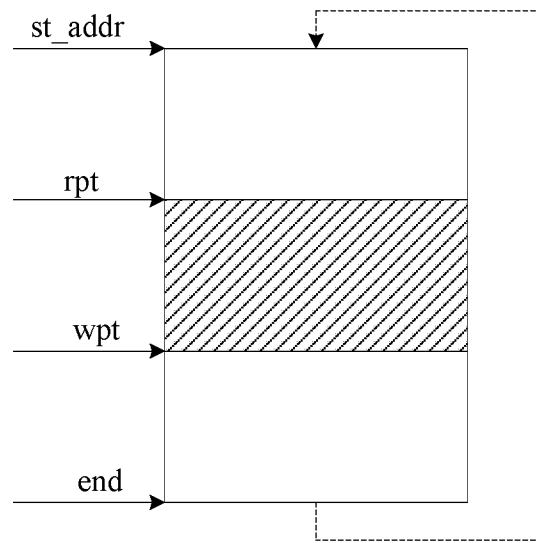
FIG. 4 is a schematic diagram of audio data between a first read pointer and a first write pointer in a first buffer provided by an embodiment of the present disclosure.
Figure 5:
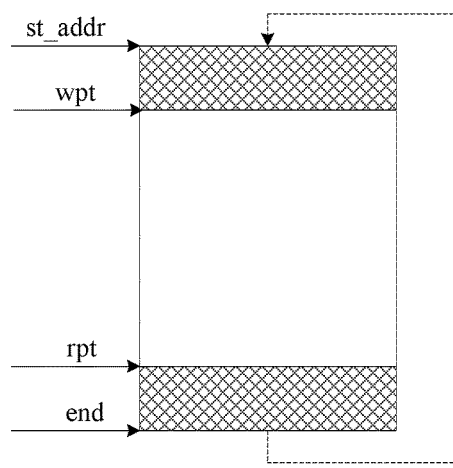
FIG. 5 is a schematic diagram of audio data between a first read pointer and a first write pointer in a first buffer provided by another embodiment of the present disclosure.

Since the first buffer is a ring buffer, situations that the first write pointer is greater than the first read pointer and the first write pointer is smaller than the first read pointer may appear. Specifically, refer to FIGS. 4 and 5, in which FIG. 4 shows the situation that the first write pointer is greater than the first read pointer. In this situation, the audio data between the first write pointer and the first read pointer is audio data between [rpt, wpt], which is shown as a portion represented by a slash in FIG. 4, and then the unit of the at least one information control node to be configured is configured according to the audio data between [rpt, wpt]. FIG. 5 shows the situation that the first read pointer is greater than the first write pointer. In this situation, the audio data between the first read pointer and the first write pointer is audio data between the first read pointer and the tail address of the first buffer and audio data between the start address of the first buffer and the first write pointer, i.e., audio data between [rpt, end] and between [st_addr, wpt], which are shown as portions represented by a double slash in FIG. 5. And then the unit of the at least one information control node to be configured is configured according to the audio data between [rpt, end] and between [st_addr, wpt].

That is to say, each time the threshold interrupt is triggered, the unit of the at least one information control node to be configured is configured according to the audio data to be played between the first read pointer and the first write pointer in the first buffer. The configured information control node contains attribute information for the audio data to be played, which includes the start address and the length of the audio data to be played. In an example, in step 205b, the channels, the number of the channels and the sampling rate of the audio data to be played may also be configured into the unit of the at least one information control node to be configured. In this way, the configured information control node contains the start address, the length, the channels, the sampling rate and the number of the channels of the audio data to be played.

In step 206, the configured information control node is chained to the first queue.

Figure 7:
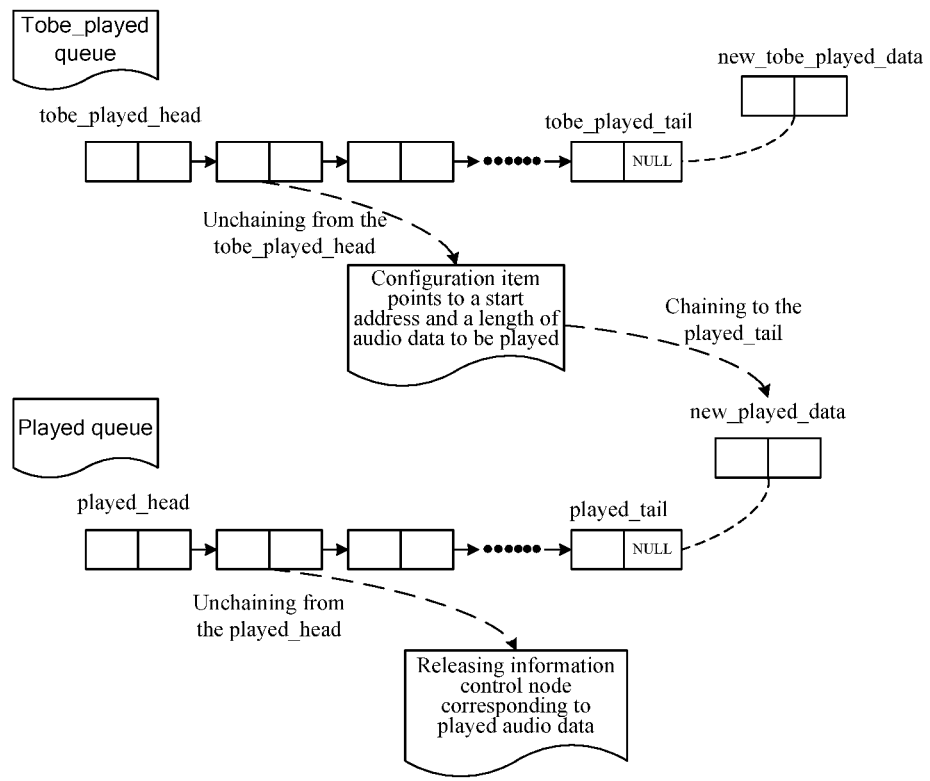
FIG. 7 is a logic schematic diagram of an interaction between a second queue and a third queue provided by an embodiment of the present disclosure.

In an example, as shown in FIG. 7, the configured information control node is chained to the queue tail of the first queue (tobe_played queue).

In step 207, a unit of at least one configured information control node is unchained from the first queue.

In an embodiment of the present disclosure, whether the tobe_played queue is empty is determined firstly before performing step 207. If the tobe_played queue is empty, a new incoming configured information control node of the audio data to be displayed (shown as "new_tobe_played_data" in FIG. 7) is chained to the end of the tobe_played queue (shown as "tobe_played_tail" in FIG. 7). If the tobe_played queue is not empty, a unit of the at least one configured information control node is unchained from the tobe_played queue. Specifically, a unit of the at least one configured information control node is unchained from the queue head of the tobe_played queue (shown as "tobe_played_head" in FIG. 7). In this situation, a new incoming configured information control node of the audio data to be played may continue to be chained to the queue tail of the tobe_played queue. For example, a unit of the at least one configured information control node is a configured information control node, and audio data to be played corresponding to the configured information control node may also be called a piece of data.

In step 208, based on the unit of the at least one configured information control node, a configuration item of a plurality of configuration items in the second buffer corresponding to a Read Direct Memory Access (RDMA) is configured.

In an example, PCM audio data from a plurality of channels is stored in the first buffer (i.e., an audio buffer), and the audio data in the first buffer belongs to audio data to be played. In an embodiment of the present disclosure, the RDMA is used to read the audio data to be played in the first buffer. Wherein, the RDMA actually is a read DMA, and the DMA facilitates communications among various hardware devices, without having to rely on a large number of interrupt loads of the CPU.

In an embodiment of the present disclosure, the RDMA has a corresponding second buffer which includes a plurality of configuration items, each of which has control information. In addition, the second buffer has a second write pointer and a second read pointer therein. Audio data reading operations of the RDMA are performed depending on the second writer pointer and the second read pointer of the second buffer. Wherein, the second writer pointer is controlled by the CPU, and the second read pointer is maintained by RDMA itself.

Figure 6:
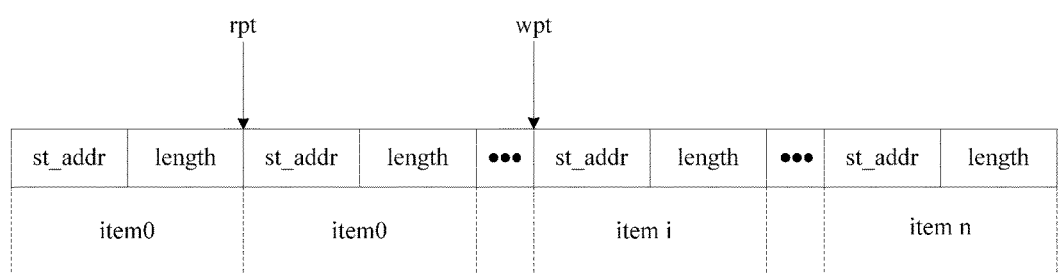
FIG. 6 is a schematic diagram of a second buffer corresponding to RDMA provided by an embodiment of the present disclosure.

In an embodiment of the present disclosure, an Integrated Circuit (IC) implements the second buffer corresponding to the RDMA as a ring buffer (hereafter called a second ring buffer to distinguish from the first ring buffer) including a plurality of configuration items. Each of the plurality of items is used to control the RDMA to read audio data stored in the first ring buffer. Each of the plurality of items consists of 64 bits, wherein a first 32 bit (i.e., a first word) is a starting address parameter (st_addr) which indicates a physical address of the first ring buffer where PCM audio data to be read by the RDMA is stored, and a second 32 bit (i.e., a second word) includes a length parameter which represents a length of the PCM audio data to be read. The relationship between the second write pointer, the second read pointer of the RDMA and the configuration items of the second ring buffer is shown in FIG. 6.

It should be noted that the number of the plurality of configuration items in the second ring buffer is determined by the CPU, and control information such as a start address, a length, etc. of each of the plurality of configuration items is also updated in real time by the CPU.

In an embodiment of the present disclosure, step 208, which is that based on the unit of the at least one configured information control node, a configuration item of a plurality of configuration items in the second buffer corresponding to the RDMA is configured, comprises sub-steps 208a-208c.

In step 208a, a target configuration item of the plurality of configuration items pointed by the second write pointer in the second buffer is determined.

In an embodiment of the present disclosure, the target configuration item is determined by reading a register corresponding to the second write pointer. The register stores information about the target configuration item. In another embodiment of the present disclosure, the plurality of items (assume 20 items) of the RDMA is achieved as a structure array, and the target configuration item pointed by the second write pointer is obtained by an index of the array corresponding to the second write pointer.

In step 208b, the starting address parameter of the target configuration item is set as the start address of the audio data to be played.

In step 208c, the length parameter of the target configuration item is set as the length of the audio data to be played.

In an embodiment of the present disclosure, after the target configuration item is obtained, the first word (i.e. the start address parameter) of the target configuration item is configured according to the start address of the audio data to be played in the unit of the at least one configured information control node, in order to make the first word point to the physical address of the first buffer (DDR) where the audio data to be played is. Then the second word (i.e. the length parameter) of the target configuration item is configured to store the length of the audio data to be played. For example, the length is a multiple of 128 bytes required by the hardware. In the second ring buffer, the second read pointer points to a configured item to be played, and the second write pointer points to a configuration item being configured or to be configured.

In an embodiment of the present disclosure, in order to ensure that the second write pointer in the second buffer has a writable configuration item and the second read pointer has a readable configuration item, and thus to ensure that the problem of sound skipping (i.e., sound missing) caused by writing fast (i.e., the CPU configures the configuration item of the RDMA and updates the second write pointer) and by reading slow (i.e. RDMA reads a specified address and a specified length of data corresponding to the configuration item, and updates the second read pointer), as well as the problem of sound stuck caused by writing slow and reading fast may not arise, a difference between the second write pointer and the second read pointer in the second buffer may be calculated. If the difference between the second write pointer and the second read pointer in the second buffer satisfies a certain condition, a unit of the at least one configured information control node is unchained from the first queue, and a corresponding configuration item of the plurality of configuration items is configured according to the unit of the at least one configured information control node. For example, the certain condition satisfied by the difference between the second write pointer and the second read pointer in the second buffer is that the difference between the second write pointer and the second read pointer in the second buffer is smaller than or equal to a fourth preset threshold. The fourth preset threshold is set according to the number of the plurality of configuration items in the second buffer, a processing capability of the CPU, etc., to meet the actual demand. The setting manner of the fourth preset threshold is not limited.

In step 209, according to the attribute information for the audio data to be played in the unit of the at least one configured information control node, audio data to be played corresponding to the unit of the at least one configured information control node is read.

In an embodiment of the present disclosure, step 209 comprises sub-steps 209a-209c.

In sub-step 209a, the second writer pointer in the second buffer is updated.

Since the second buffer corresponding to the RDMA is the second ring buffer, in an embodiment of the present disclosure, sub-step 209a includes sub-steps 209a1-209a3.

In sub-step 209a1, whether the target configuration item is a last configuration item of the plurality configuration items in the second ring buffer is determined.

If so, sub-step 209a2 is performed, and if not, sub-step 209a3 is performed.

In sub-step 209a2, in response to that the target configuration item is the last configuration item of the plurality of configuration items in the second ring buffer, the second write pointer in the second ring buffer is configured to be at a position of a first configuration item of the plurality of configuration items corresponding to the start address of the second ring buffer.

In sub-step 209a3, in response to that the target configuration node is not the last configuration node of the plurality of configuration items in the second ring buffer, the second write pointer in the second ring buffer is configured to be at a position of a next configuration item of the plurality of configuration items adjacent to the target configuration item in the second ring buffer.

Specifically, since the RDMA acts on the second ring buffer, whether the target configuration item is the last configuration item in the second ring buffer may be determined. If the target configuration item is the last configuration item in the second ring buffer, the second write pointer is configured to be at the position of the first configuration item corresponding to the start position of the RDMA. Otherwise, the second write pointer is configured to be at the position of the next configuration item adjacent to the target configuration item.

In sub-step 209b, a difference between the second write pointer and the second read pointer in the second buffer is calculated.

In sub-step 209c, in response to that the difference between the second write pointer and the second read pointer in the second buffer is greater than or equal to a second preset threshold, the audio data to be played corresponding to the configuration item of the plurality of configuration items pointed by the read pointer is read.

The second write pointer of the RDMA is controlled by the CPU, and the second read pointer is maintained by the RDMA itself. After the target configuration item is configured and the second write pointer is updated, when the difference between the second write pointer at the updated position and the second read pointer of the RDMA is greater than or equal to the second preset threshold (such as 1 item), the RDMA will automatically read a specified length of PCM audio data in the first buffer (memory position) corresponding to the configuration item pointed by the second read pointer. Thus, it ensures that there is a readable configuration item at this moment, so the audio data to be played corresponding to the configuration item pointed by the second read pointer may be read. When the difference between the second write pointer and the second read pointer of the RDMA is smaller than the fourth preset threshold, it means that the second read pointer in the RDMA is catching up with the second write pointer. Then the CPU is reminded that the audio data is not enough, and needs to configure new configuration item in time to point to new audio data to be played, so as to avoid emergence of problems such as sound stuck, even no sound and other issues due to no temporary readable data. Wherein, the fourth preset threshold is set according to the number of the plurality of configuration items in the second buffer, the processing capability of the CPU, etc. It should be noted that the fourth preset threshold may be the same as or different from the second preset threshold.

Meanwhile, the RDMA in an embodiment of the present disclosure may also update the second read pointer, and automatically updates the second read pointer to a position of a configuration item of the plurality of configuration items next to the configuration item pointed by the second read pointer. As the second buffer corresponding to the RDMA is the second ring buffer, the second read pointer will automatically ring to the starting position of the second ring buffer when it goes to the tail of the second ring buffer, and the second write pointer needs to be maintained by CPU to the head of the second ring buffer, so as to recycle the memory space.

In step 210, the unit of the at least one configured information control node is chained to the second queue.

As shown in FIG. 7, after the configuration item of the configuration items in the second buffer corresponding to the RDMA is configured according to the attribute information for the audio data to be played in the unit of the at least one configured information control node, the unit of the at least one configured information control node (shown as "new_played_data" in FIG. 7) is chained to the queue tail of the played queue (shown as "played_tail" in FIG. 7).

According to the technical solution described in the above steps 201-210, after the WDMA starts to capture the audio data to be played, every time a threshold interrupt is reached, the unit of the at least one information control node to be configured is unchained from the queue head of the tobe_pushed queue. In turn, the control information (i.e., information such as the start address, length, sampling rate, etc. of the audio data to be played as described above) is developed according to the audio data to be played between [rpt,wpt] captured when the threshold interrupt is triggered. Thus the unit of the at least one information control node unchained from the tobe_pushed queue may have these information which corresponds to the audio data to be played captured when the interrupt is triggered and may be one unit of configured information control node, and then the unit of configured information control node is chained to the queue tail of the tobe_played queue. Before the RDMA starts to read the data to be played, a unit of the at least one configured information control node is unchained from the queue head of the tobe_played queue, and then the attribute information for audio data to be played (i.e., the start address and length of the audio data to be played) carried by the unit of the at least one configured information control node is configured into a configuration item of the plurality of configuration items in the second buffer corresponding to the RDMA. In turn, the unit of the at least one configured information control node unchained from the queue head of the tobe_played queue is chained to the queue tail of the played queue.

Further, in order to make an information control node be unchained and chained at an appropriate time to solve the problem of memory space waste of the system and the problem of excessive memory fragmentations due to implementation of the allocation of information control node, as shown in FIG. 2, in an embodiment of the present disclosure, the method includes steps 211-214.

In step 211, a position of the second read pointer in the second buffer is determined.

In step 212, a difference between a first marker pointer and a second marker pointer in the second buffer is calculated.

Wherein, the first marker pointer points to a previous position of the position of the second read pointer in the second buffer, and the second marker pointer points to a position of the first marker pointer at the time of the last release.

In step 213, in response to that the difference between the first marker pointer and the second marker pointer in the second buffer is greater than or equal to a third preset threshold, at least one unit of the at least one configured information control node in the second queue corresponding to at least one configuration item of the plurality of configuration items between the first marker pointer and the second marker pointer is unchained and released.

Wherein, the third preset threshold is set according to the number of the plurality of configuration items in the second buffer, the processing capability of the CPU, etc. The step that the at least one unit of the at least one configuration control node corresponding to at least one configuration item of the plurality of configuration items between the first marker pointer and the second marker pointer is unloaded and released means that, configuration information in each of the at least one unit of the at least one configured information control node is released while the at least one unit of the at least one configured information control node is unchained.

In step 214, the at least one unit of the at least one configured information control node, which is unchained from the second queue and released, is chained to the third queue.

According to the technical solution described in steps 211-214, in an embodiment of the disclosure, after a piece of audio data is played, a play_item interface is called. After determining that the first marker pointer and the second marker pointer satisfy a certain condition, whether the played queue is non-empty is determined. If the played queue is non-empty, at least one unit of the at least one configured information control node corresponding to the played audio data is unchained from the queue head of the played queue (shown as "played_head" in FIG. 7), and then is chained to the queue tail of the tobe_pushed queue. In this way, the allocated information control node having fixed number when initializing may be recycled, and the problems of the memory space waste of the system and of the excessive memory fragmentations due to implementation of the frequent allocations of information control node is solved, so as to avoid wasting the resources of the system.

Further, since the audio data is derived from different channels, when the audio data to be played is derived from a first channel, in an embodiment of the present disclosure, as shown in FIG. 3, after step 209, the method further includes steps 215-216.

In step 215, whether a switching is performed from the first channel to a second channel is detected.

In step 216, in response to the switching from the first channel to the second channel, at least one remaining configured information control node of the at least one configured information control node in the first queue is unchained and released.

The second channel in the embodiment of the present disclosure is different from the first channel, and when it is detected that a switching is performed from the first channel to the second channel, the at least one remaining information control node of the at least one configured information control node in the first queue is unchained and released. In an embodiment of the present disclosure, the audio data allocated before the channel switching is corresponding to audio data in the last channel, and when the channel switching is over and audio data of the newly switched channel is beginning to be played, an information control node will be unchained from the queue head of the tobe_played queue. If there is still some unreleased audio data of the last channel in the tobe_played queue, these audio data will be firstly configured into the configuration items of RDMA, and then RDMA will firstly read audio data corresponding to these items and then read the audio data in the new channel configured in real time. Therefore, after the channel switching, the residual audio data in the last channel will be firstly played for a while and then the audio data in the newly switched channel will be played. In an embodiment of the present disclosure, at least one configured information control node, which is not configured to the configuration items of RDMA, between the queue head and the queue tail of the tobe_played queue, i.e., the configured information control nodes corresponding to residual un-played audio data are unchained and released, so as to solve the problem that the residual audio data in the last channel will be firstly played for a while and then the audio data in the newly switched channel will be played. In addition, the unchaining and release action is very fast, which is calculated in milliseconds, and thus the user's waiting time for switching channels is greatly reduced, thereby the user's audio-visual experience is enhanced.

In the method for processing audio data based on the above embodiments, the audio data to be played and the audio data played are separately managed by the way of queues to be effectively distinguished. Meanwhile, the information control node to be configured is configured according to the audio data to be played corresponding to the threshold interrupt in real time, and the corresponding audio data to be played is read to play according to the configured information control node, which will not results in the problem like that in the prior art in which the audio data to be played is copied to another memory space and then the audio data to be played in the copied memory space is read by an audio read module. With the technical solution in the embodiment of the present disclosure, the audio data to be played will not be overwritten, and meanwhile the development and use of memory space used for backup as in the prior art will be omitted, the influence to the television performance due to the frequent memory copy will be eliminated, the memory aligning action is saved so that the operation procedure is simplified, costs of the complex realization of the memory pool, management and post-maintenance will be avoided, and the design idea is simplified. That is, the embodiment of the present disclosure realizes that the audio data to be played is not overwritten while avoiding the problem of setting the memory pool, and ensures that the audio data is played in real time, orderly, smoothly and stably. Further, the problem as the memory space waste of the television and the problem as excessive memory fragmentations due to implementation of the configurations of information control node is solved by unchaining and chaining the information control node in the queue at an appropriate time.

Figure 8:
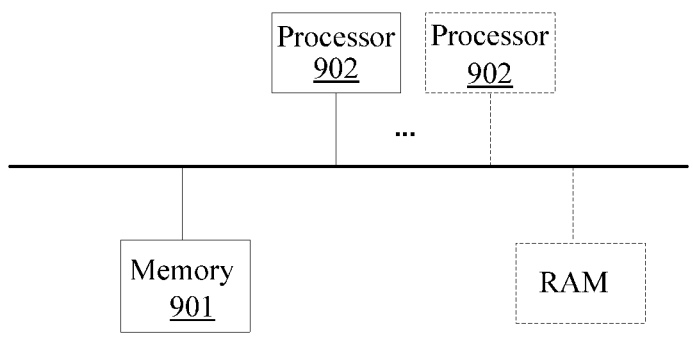
FIG. 8 is a structure diagram of a terminal provided by an embodiment of the present disclosure.

An embodiment of the present disclosure provides a terminal, and an implementation of each functional unit in the terminal refers to the method in the above embodiments, and will not be described again here. As shown in FIG. 8, the terminal 90 includes a memory 901 and a processor 902 coupled to the memory 901. The memory 901 stores instructions. The instructions, when executed by the processor 902, cause the terminal 90 to set a first queue for managing at least one configured information control node of audio data to be played and a second queue for managing at least one configured information control node of played audio data. Each of the at least one configured information control node of audio data to be played contains attribute information for the audio data to be played. Then the terminal 90 unchains a unit of the at least one configured information control node from the first queue. In turn, the terminal 90 reads audio data to be played corresponding to the unit of the at least one configured information control node according to the attribute information for the audio data to be played in the unit of the at least one configured information control node. Then the terminal 90 chains the unit of the at least one configured information control node to the second queue.

Figure 9:
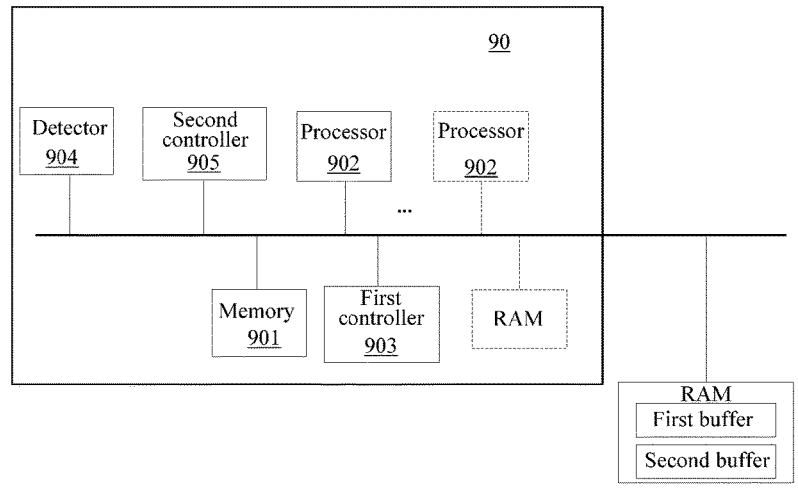
FIG. 9 is a structure diagram of a terminal provided by another embodiment of the present disclosure.

In an embodiment of the present disclosure, as shown in FIG. 9, the terminal 90 further includes a first controller. The instructions, when executed by the processor 902, cause the terminal 90 to read, by the first controller 903, audio data to be played corresponding to the unit of the at least one configured information control node according to the attribute information for the audio data to be played in the unit of the at least one configured information control node. The first controller 903 may be a DMA controller, which is implemented as audio data to be played corresponding to the unit of the at least one configured information control node being read by the RDMA.

In an embodiment of the disclosure, the audio data to be played corresponding to the unit of the at least one configured information control node is the audio data in a first channel. As shown in FIG. 9, the terminal 90 further includes a detector 904. The instructions, when executed by the processor 902, cause the terminal 90 to detect, by the detector 904, whether a switching is performed from a first channel to a second channel. In response to that the detector 904 detected that the switching is performed from a first channel to a second channel, the processor 902 unchains and releases at least one remaining configured information control node of the at least one configured information control node in the first queue.

In an embodiment of the present disclosure, the instructions, when executed by the processor 902, cause the terminal 90 to set, by the processor 902, a third queue which is used for managing at least one information control node to be configured, and the third queue includes the at least one information control code to be configured. Then the processor 902 unchains a unit of the at least one information control node to be configured from the third queue upon receiving a trigger instruction. In turn, the processor 902 configures the unit of the at least one information control node to be configured. Then, the processor 902 chains the configured information control node to the first queue.

In an embodiment of the present disclosure, as shown in FIG. 9, the terminal 90 further includes a second controller 905. The instructions, when executed by the processor 902, cause the terminal 90 to capture, by the second controller 905, the audio data to be played using a WDMA. The WDMA is corresponding to a first buffer which includes a first read pointer and a first write pointer. Then the processor 902 detects whether the difference between the first write pointer and the first read pointer in the first buffer is greater than or equal to a first preset threshold. In response to that the processor 902 detected that the difference between the first write pointer and the first read pointer in the first buffer is greater than or equal to a first preset threshold, it triggers a threshold interrupt to generate a trigger instruction.

In an embodiment of the present disclosure, the instructions, when executed by the processor 902, cause the terminal 90 to configure, by the processor 902, the start address and the length of the audio data to be played to the unit of the at least one information control node to be configured according to the audio data to be played between the first read pointer and the first write pointer in the first buffer.

In an embodiment of the present disclosure, the instructions, when executed by the processor 902, cause the terminal 90 to configure, by the processor 902, the channels, the number of the channels and the sampling rate of the audio data to be played to the unit of the at least one information control nodes to be configured.

In an embodiment of the present disclosure, the instructions, when executed by the processor 902, cause the terminal 90 to, based on the unit of configured information control node, configure, by the processor 902, a configuration item of a plurality of configuration items in a second buffer corresponding to a RDMA. Wherein, the second buffer includes a second write pointer, a second read pointer and a plurality of configuration items having configuration information.

In an embodiment of the present disclosure, the configuration information includes the starting address parameter and the corresponding length parameter. The instructions, when executed by the processor 902, cause the terminal 90 to configure, by the processor 902, determine the target configuration item of the plurality of configuration items pointed by the second write pointer in the second buffer. Then the processor 902 sets the starting address parameter of the target configuration item as the start address of the audio data to be played. In turn, the processor 902 sets the length parameter of the target configuration item to be the data length of the audio data to be played.

In an embodiment of the present disclosure, the instructions, when executed by the processor 902, cause the terminal 90 to update, by the processor 902, the second writer pointer in the second buffer. Then the processor 902 calculates the difference between the second write pointer and the second read pointer in the second buffer. In turn, in response to that the difference between the second write pointer and the second read pointer in the second buffer is greater than or equal to a second preset threshold, the processor 902 reads the audio data to be played corresponding to the configuration item pointed of the plurality of configuration items by the second read pointer.

In an embodiment of the present disclosure, the second buffer is a second ring buffer. In this situation, the instructions, when executed by the processor 902, cause the terminal 90 to determine, by the processor 902, whether the target configuration node is the last configuration node of the plurality of configuration items in the second ring buffer. In response to that the target configuration node is the last configuration node of the plurality of configuration items in the second ring buffer, the processor 902 configures the second write pointer in the second buffer to be at the position of a first configuration item of the plurality of configuration items corresponding to the start address of the second ring buffer. In response to that the target configuration node is not the last configuration node of the plurality of configuration items in the second ring buffer, the processor 902 configures the second write pointer in the second buffer to be at the position of the next configuration item of the plurality of configuration item adjacent to the target configuration item in the second buffer.

In an embodiment of the present disclosure, the instructions, when executed by the processor 902, cause the terminal 90 to determine, by the processor 902, the position of the second read pointer in the second buffer. Then the processor 902 calculates a difference between a first marker pointer and a second marker pointer in the second buffer. The first marker pointer points to a previous position of the position of the second read pointer in the second buffer, and the second marker pointer points to the position of the first marker pointer at the time of the last release. In turn, in response to that the difference between the first marker pointer and the second marker pointer in the second buffer is greater than or equal to a third preset threshold, the processor 902 unloads and releases the at least one unit of the at least one configured information control node corresponding to at least one configuration item of the plurality of configuration items between the first marker pointer and the second marker pointer. Then, the processor 902 chains the at least one unit of the at least one configured information control node to the third queue.

In the terminal provided by the embodiment of the present disclosure, the first queue and the second queue are set, and a unit of the at least one configured information control node is unchained from the first queue. In addition, according to the attribute information for the audio data to be played in the unit of the at least one configured information control node, corresponding audio data to be played is read, and the unit of the at least one configured information control node is chained to the second queue. The audio data to be played and the audio data played may be separately managed by setting the first queue for managing the at least one configured information control node of the audio data to be played and the second queue for managing the at least one configured information control node of the played audio data, i.e. by the way of queues, in order to be effectively distinguished. Meanwhile, according to the unit of the at least one configured information control node, corresponding audio data to be played may be read and played, and thus a problem, which is resulted by reading copied audio data to be played in the another memory space by an audio reader when the audio data to be played is copied to the memory space, does not arise. In the technical solution provided by the embodiment of the present disclosure, the audio data to be played is not overwritten, and meanwhile the memory space developed for backup is omitted, which avoids costs of complex realization, management and later maintenance of the memory space and may simplify design ideas. In addition, an influence to the system performance due to the frequent memory copies is eliminated, and a memory aligning action is saved so that the operation procedure is simplified. That is, the embodiment of the present disclosure realizes that the audio data to be played is not overwritten while avoiding the problem of setting the memory space, and ensures that the audio data is played in real time, orderly, smoothly and stably.

Figure 10:
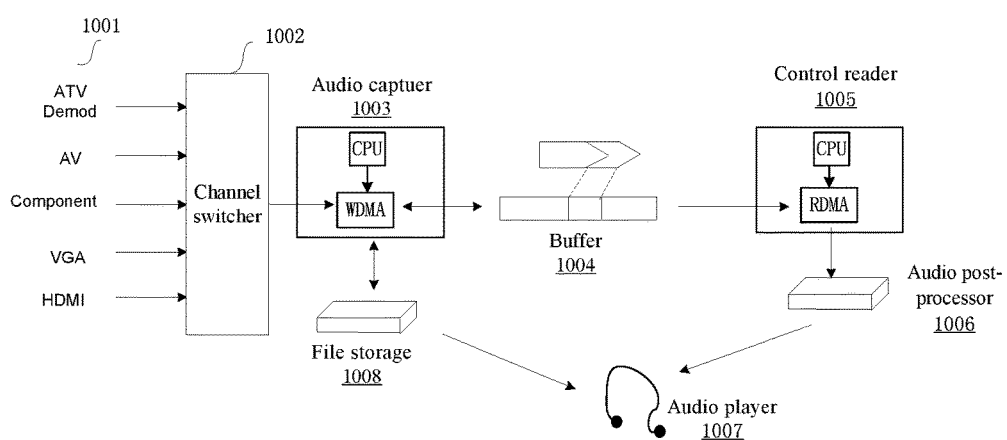
FIG. 10 is a structure diagram of a television provided by an embodiment of the present disclosure.

An embodiment of the present disclosure provides a television. As shown in FIG. 10, the television 100 includes an input interface 1001, a channel switcher 1002, an audio capturer 1003, a buffer 1004 and a control reader 1005. The input interface 1001 is configured to receive audio data inputted from a plurality of television channels. The channel switcher 1002 is configured to switch the plurality of television channels. The audio capturer 1003 is configured to capture audio data of the plurality of television channels. The buffer 1004 is configured to buffer the audio data captured by the audio capturer 1003. The control reader 1005 is configured to control and read the audio data in the buffer 1004.

In an embodiment of the present disclosure, the control reader 1005 is configured to unload a unit of the at least one information control node to be configured from the first queue when receiving a trigger instruction, and configured to configure the unit of the at least one information control node to be configured. Each of the at least one configured information control node contains attribute information for the audio data to be played, and at least one information control node to be configured is included in the first queue. The control reader 1005 is also configured to chain at least one unit of the at least one configured information control node to the second queue and the third queue which are both used for managing the configured information control nodes, and to unload a unit of the at least one configured information control node from the third queue. The control reader 1005 is also configured to read the corresponding audio data to be played according to the attribute information for the audio data to be played in the unit of the at least one configured information control node, and to chain the unit of the at least one configured information control node to a fourth queue. The fourth queue is used for managing the at least one configured information control node of the played audio data.

In an embodiment of the present disclosure, as shown in FIG. 10, the television 100 further comprises an audio post-processor 1006 configured to perform a preset sound processing to the audio data read by the control reader 1005 and an audio player 1007 configured to play the audio data processed by the audio post-processor 1006.

In an embodiment of the present disclosure, as shown in FIG. 10, the television 100 further comprises a file storage 1008 configured to store the audio data captured by the audio capturer 1003 into a file. In this situation, the audio player 1007 is further configured to play the audio data stored in the file storage 1008.

Wherein, the description to the control reader 1005 may refer to the description of the terminal in the above embodiments, and will not be described again.

In an embodiment of the present disclosure, the sources as the audio data inputted from the input module 1001 include channels such as TV Demod, AV, Component, VGA, HDMI, etc. The channel switcher 1002 is responsible for switching among the above-mentioned television channels and open the switched television channel. The audio capturer 1003 is responsible for capturing audio data in the switched television channel. In an example, the audio capturer 1003 is implemented by controlling the WDMA by the CPU. The audio capturer 1003 corresponds to the buffer 1004 which is a memory area for temporarily storing the captured audio data. The file storage 1008 stores the audio data captured from the switched television channel by the audio capturer 1003 into the file in real time. And the audio data is used as boot music of TV products, and it is also played as local audio via website or a USB interface. The correctness of the audio data captured by the audio capturer during the playback is verified by sense. Further, the audio data is used as test source of relevant audio post-processing functions (such as: Sample Rate Convert) implemented by hardware and software. The control reader 1005 reads the audio data from the buffer 1004 to the audio signal line through an Advanced eXtensible Interface (AXI) high-speed bus. That is, the control reader 1005 reads the audio data captured by the audio capturer 1003 and transmits the audio data to the audio post-processor 1006 through an audio data transmission line.

The control reader 1005 may be implemented by controlling RDMA by the CPU. The audio post-processor 1006 performs a series of processing about sound effects to the audio data read by the control reader 1005, such as Automatic Volume Control (AVC), SRC, Equalizer (EQ), Balance, etc. The audio player 1007 plays and outputs the audio data processed by the audio post-processor 1006 or audio data stored by the file storage 1008 through a loudspeaker, earphone, Spdif or Subwoofer.

For the embodiment of the television, since it is similar to the method embodiments, it is described briefly and one can refer to the partial description of the method embodiments to see relevant parts.

In these embodiments provided herein, it should be understood that the disclosed television, terminal and method may be implemented in other ways. For example, the embodiments of the terminal described above are merely illustrative. For example, multiple devices or components may be combined or may be integrated into another system, or some features may be ignored or not executed. In another respect, the coupling or direct coupling or communication connection shown or discussed may be either an indirect coupling or a communication connection through some interfaces, components or devices, which may be electrical, mechanical, or otherwise.

The component described as a separation unit may be or may not be physically separate, and the component shown as a unit may or may not be a physical unit, i.e., may be located in one place or may be distributed over a plurality of network elements. A part or all of the elements may be selected according to the actual needs to achieve the object of the present embodiment.

The above-mentioned devices may be implemented in the form of hardware, and may also be implemented in the form of hardware and software devices.

The integrated unit described above in the form of software may be stored in a computer-readable storage medium. The software functional unit is stored in a storage medium including a number of instructions for causing a computer device (which may be a personal computer, a server, or a network device, etc.) to perform some of the steps of the method described in the various embodiments of the present disclosure. The foregoing storage medium includes various medium which may store programs, such as a USB disk, a mobile hard disk, a read-only memory (ROM), a random access memory (RAM), a disk or an optical disk.

Finally, it should be noted that the above embodiments are merely illustrative of the technical solutions of the present disclosure and are not intended to limit them. Though the disclosure has been described in detail with reference to the foregoing embodiments, it will be understood by one of ordinary skill in the art that the technical solutions described in the foregoing embodiments may still be modified, or some of the technical features may be equivalently replaced, and these modifications or replacements do not make the corresponding technical solutions depart from the spirit and scope of the solutions of the various embodiments of the present disclosure.

What is claimed is:

1. A method for processing audio data, comprising:
   setting a first queue for managing at least one configured information control node of audio data to be played, wherein each of the at least one configured information control node contains attribute information for the audio data to be played;
   unchaining a unit of the at least one configured information control node from the first queue;

reading audio data to be played corresponding to the unit of the at least one configured information control node according to the attribute information for the audio data to be played in the unit of the at least one configured information control node; and chaining the unit of the at least one configured information control node to a second queue which is used for managing at least one configured information control node of played audio data.

2. The method of claim 1, wherein, the audio data to be played corresponding to the unit of the at least one configured information control node is audio data from a first channel;

after reading audio data to be played corresponding to the unit of the at least one configured information control node according to the attribute information for the audio data to be played in the unit of the at least one configured information control node, the method further comprises:

detecting whether a switching is performed from the first channel to a second channel; and in response to the switching from the first channel to the second channel, unchaining and releasing at least one remaining configured information control node of the at least one configured information control node in the first queue.

3. The method of claim 1, wherein, before unchaining the unit of the at least one configured information control node from the first queue, the method further comprises:

setting a third queue which is used for managing at least one information control node to be configured, and includes the at least one information control node to be configured;

capturing audio data to be played using a Write Direct Memory Access (WDMA), wherein the WDMA is corresponding to a first buffer including a first read pointer and a first write pointer;

detecting whether a difference between the first write pointer and the first read pointer in the first buffer is greater than or equal to a first preset threshold;

triggering a threshold interrupt to generate a trigger instruction in response to that the difference between the first write pointer and the first read pointer in the first buffer is greater than or equal to the first preset threshold;

unchaining a unit of the at least one information control node to be configured from the third queue upon receiving the trigger instruction, and configuring the unit of the at least one information control node to be configured; and chaining the configured information control node to the first queue.

4. The method of claim 3, wherein, said unchaining a unit of the at least one information control node to be configured from the third queue upon receiving the trigger instruction and configuring the unit of the least one information control node to be configured, comprise:

unchaining a unit of the at least one information control node to be configured from the third queue according to the trigger instruction; and configuring a start address and a length of the audio data to be played into the unit of the at least one information control node to be configured according to the audio data to be played between the first read pointer and the first write pointer in the first buffer.

5. The method of claim 4, wherein, before reading audio data to be played corresponding to the unit of the at least one configured information control node according to the attribute information for the audio data to be played in the unit of the at least one configured information control node, the method further comprises:

based on the unit of the at least one configured information control node, configuring a configuration item of a plurality of configuration items included in a second buffer which is corresponding to a RDMA, wherein, the second buffer further includes a second write pointer and a second read pointer and a configuration item has configuration information including a starting address parameter and a length parameter, said based on the unit of the at least one configured information control node, configuring a configuration item of a plurality of configuration items included in a second buffer which is corresponding to a RDMA, comprises:

determining a target configuration item of the plurality of configuration items pointed by the second write pointer in the second buffer;

setting a starting address parameter of the target configuration item as a start address of the audio data to be played; and setting a length parameter of the target configuration item as a data length of the audio data to be played.

6. The method of claim 5, wherein, said reading audio data to be played corresponding to the unit of the at least one configured information control node according to the attribute information for the audio data to be played in the unit of the plurality of configured information control node, comprises:

updating the second writer pointer in the second buffer;

calculating a difference between the second write pointer and the second read pointer in the second buffer; and in response to that the difference between the second write pointer and the second read pointer in the second buffer is greater than or equal to a second preset threshold, reading audio data to be played corresponding to a configuration item of the plurality of configuration items pointed by the second read pointer in the second buffer.

7. The method of claim 6, wherein, the second buffer is a ring buffer, said updating the second writer pointer in the second buffer comprises:

determining whether the target configuration item is a last configuration item of the plurality configuration items of the ring buffer;

in response to that the target configuration item is a last configuration item of the plurality configuration items of the ring buffer, configuring the second write pointer in the ring buffer to be at a position of a first configuration item of the plurality of configuration items corresponding to a start address of the ring buffer; and in response to that the target configuration item is not a last configuration item of the plurality configuration items of the ring buffer, configuring the second write pointer in the ring buffer to be at a position of a configuration item of the plurality of configuration items next to the target configuration item in the ring buffer.

8. The method of claim 5, wherein, the method further comprises:

determining a position of the second read pointer in the second buffer;

calculating a difference between a first marker pointer and a second marker pointer in the second buffer, wherein, the first marker pointer points to a previous position of the position of the second read pointer in the second buffer and the second marker pointer points to a position of the first marker pointer at the time of a last release;

in response to that the difference between the first marker pointer and the second marker pointer in the second buffer is greater than or equal to a third preset threshold, unchaining and releasing at least one unit of the at least one configuration control node in the second queue corresponding to at least one configuration item of the plurality of configuration items between the first marker pointer and the second marker pointer in the second buffer; and chaining the at least one unit of the at least one configuration node in the second buffer to the third queue.

9. A terminal, comprising:
a memory configured to store instructions; and
a processor coupled to the memory, wherein,
the instructions, when executed by the processor, cause the terminal to:
setting a first queue for managing at least one configured information control node of audio data to be played, wherein each of the at least one configured information control node contains attribute information for the audio data to be played;
unchaining a unit of the at least one configured information control node from the first queue;
reading audio data to be played corresponding to the unit of the at least one configured information control node according to the attribute information for the audio data to be played in the unit of the at least one configured information control node; and
chaining the unit of the at least one configured information control node to a second queue which is used for managing at least one configured information control node of played audio data.

10. The terminal of claim 9, further comprises a first controller, wherein,
the instructions, when executed by the processor, cause the terminal to:
reading, by the first controller, audio data to be played corresponding to the unit of the at least one configured information control node according to the attribute information for the audio data to be played in the unit of the at least one configured information control node.

11. The terminal of claim 9, wherein, the audio data to be played corresponding to the unit of the at least one configured information control node is audio data from a first channel,
the terminal further comprises detector,
the instructions, when executed by the processor, cause the terminal to:
detecting, by the detector, whether a switching is performed from the first channel to a second channel; and
in response to the switching from the first channel to the second channel, unchaining and releasing, by the processor, at least one remaining configured information control node of the at least one configured information control node in the first queue.

12. The terminal of claim 10, wherein, further comprises a second controller, wherein,
the instructions, when executed by the processor, cause the terminal to:
setting, by the processor, a third queue which is used for managing at least one information control node to be configured, and includes the at least one information control code to be configured;

capturing, by the second controller, audio data to be played using a Write Direct Memory Access (WDMA), wherein the WDMA is corresponding to a first buffer including a first read pointer and a first write pointer;
detecting, by the processor, whether a difference between the first write pointer and the first read pointer in the first buffer is greater than or equal to a first preset threshold;
triggering, by the processor, a threshold interrupt to generate a trigger instruction in response to that the difference between the first write pointer and the first read pointer in the first buffer is greater than or equal to the first preset threshold;
unchaining, by the processor, a unit of the at least one information control node to be configured from the third queue upon receiving the trigger instruction,
configuring, by the processor, the unit of the at least one information control node to be configured; and
chaining, by the processor, the configured information control node to the first queue.

13. The terminal of claim 12, wherein, the instructions, when executed by the processor, cause the terminal to:
configuring, by the processor, a start address and a length of the audio data to be played into the unit of the at least one information control node to be configured according to the audio data to be played between the first read pointer and the first write pointer in the first buffer.

14. The terminal of claim 13, wherein, the instructions, when executed by the processor, cause the terminal to:
based on the unit of the at least one configured information control node, configuring, by the processor, a configuration item of a plurality of configuration items included in a second buffer which is corresponding to a RDMA, wherein, the second buffer further includes a second write pointer and a second read pointer and a configuration item has configuration information including a starting address parameter and a length parameter;
determining, by the processor, a target configuration item of the plurality of configuration items pointed by the second write pointer in the second buffer;
setting, by the processor, a starting address parameter of the target configuration item as a start address of the audio data to be played; and
setting, by the processor, a length parameter of the target configuration node as a data length of the audio data to be played.

15. The terminal of claim 14, wherein, the instructions, when executed by the processor, cause the terminal to:
updating, by the processor, the second writer pointer in the second buffer;
calculating, a by the processor, difference between the second write pointer and the second read pointer in the second buffer; and
in response to that the difference between the second write pointer and the second read pointer in the second buffer is greater than or equal to a second preset threshold, reading, by the processor, audio data to be played corresponding to a configuration item of the plurality of configuration items pointed by the second read pointer in the second buffer.

16. The terminal of claim 15, wherein, the second buffer is a ring buffer,
the instructions, when executed by the processor, cause the terminal to:

determining, by the processor, whether the target configuration item is a last configuration item of the plurality of configuration items of the ring buffer;

in response to that the target configuration item is a last configuration item of the plurality of configuration items of the ring buffer, configuring, by the processor, the second write pointer in the ring buffer to be at a position of a first configuration item of the plurality of configuration items corresponding to a start address of the ring buffer; and in response to that the target configuration item is not a last configuration item of the plurality of configuration items of the ring buffer, configuring, by the processor, the second write pointer in the ring buffer to be at a position of a configuration item of the plurality of configuration items next to the target configuration item in the ring buffer.

17. The terminal of claim 14, wherein, the instructions, when executed by the processor, cause the terminal to:

determining, by the processor, a position of the second read pointer in the second buffer;

calculating, by the processor, a difference between a first marker pointer and a second marker pointer in the second buffer, wherein, the first marker pointer points to previous position of the position of the second read pointer in the second buffer and the second marker pointer points to the position of the first marker pointer at the time of a last release;

in response to that the difference between the first marker pointer and the second marker pointer in the second buffer is greater than or equal to a third preset threshold, unchaining and releasing, by the processor, at least one unit of the at least one configured information control node in the second queue according to at least one configuration item of the plurality of configuration items between the first marker pointer and the second marker pointer in the second buffer; and chaining, by the processor, the at least one unit of at least one configured information control node in the second queue to the third queue.

18. A television, comprising:

an input interface configured to receiving audio data from a plurality of television channels;

a channel switcher configured to switching the plurality of television channels;

an audio capturer configured to capture audio data of the plurality of television channels;

a buffer configured to buffer the audio data captured by the audio capturer; and a control reader configured to control to read the audio data in the buffer, an audio post-processor configured to perform a preset sound processing to the audio data read by the control reader; and an audio player configured to play the audio data processed by the audio post-processor, wherein, the control reader is configured to:

set a first queue for managing at least one configured information control node of audio data to be played, wherein each of the at least one configured information control node contains attribute information for the audio data to be played;

unchain a unit of the at least one configured information control node from the first queue;

read audio data to be played corresponding to the unit of the at least one configured information control node according to the attribute information for the audio data to be played in the unit of the at least one configured information control node; and chain the unit of the at least one configured information control node to a second queue which is used for managing at least one configured information control node of played audio data.

19. The television of claim 18, further comprising:

a file storage configured to store the audio data captured by the audio capturer to a file, wherein, the audio player configured to play the audio data stored in the file.

* * * * *